(12) United States Patent
Kurihara

(10) Patent No.: US 8,535,807 B2
(45) Date of Patent: Sep. 17, 2013

(54) ANTI-REFLECTION FILM AND INFRARED OPTICAL ELEMENT

(75) Inventor: Tadayuki Kurihara, Tochigi (JP)

(73) Assignee: Fujifilm Corporation, Tokyo (JP)

( * ) Notice: Subject to any disclaimer, the term of this patent is extended or adjusted under 35 U.S.C. 154(b) by 375 days.

(21) Appl. No.: 13/079,502

(22) Filed: Apr. 4, 2011

(65) Prior Publication Data

US 2011/0244224 A1    Oct. 6, 2011

(30) Foreign Application Priority Data

Apr. 2, 2010  (JP) .................. 2010-086297

(51) Int. Cl.
*C03C 17/34*  (2006.01)

(52) U.S. Cl.
CPC .................. *C03C 17/3452* (2013.01)
USPC ............ 428/432; 428/469; 428/701; 428/702

(58) Field of Classification Search
None
See application file for complete search history.

(56) References Cited

U.S. PATENT DOCUMENTS

| 4,498,728 A | * | 2/1985 | Thoni et al. ............... 359/359 |
| 2010/0035036 A1 | * | 2/2010 | McCloy et al. .............. 428/220 |
| 2010/0285946 A1 | | 11/2010 | Tani et al. |

FOREIGN PATENT DOCUMENTS

| JP | 01015703 A | * | 1/1989 |
| JP | 06-313802 | | 11/1994 |
| JP | 2000147205 A | * | 5/2000 |
| JP | 3361621 | | 10/2002 |
| JP | 2006-072031 | | 3/2006 |

* cited by examiner

*Primary Examiner* — David Sample
(74) *Attorney, Agent, or Firm* — Young & Thompson

(57) ABSTRACT

An anti-reflection film provided on a surface of a chalcogenide glass base includes a first thin film layer and a second thin film layer. The first thin film layer is composed of a single layer of $Bi_2O_3$ formed by ion beam assisted deposition. The second thin film layer made of $YF_3$ includes assisted layers and non-assisted layers laminated alternately. The assisted layers are formed by the ion beam assisted deposition, while the non-assisted layers are formed without assistance of an ion beam. The assisted layer is superior in adhesion and surface flatness or smoothness. On the other hand, the non-assisted layer has small internal stress. The second thin film layer functions as a buffer to relieve the internal stress of the first and second thin film layers.

10 Claims, 3 Drawing Sheets

ANTI-REFLECTION FILM AND INFRARED OPTICAL ELEMENT

BACKGROUND OF THE INVENTION

1. Field of the Invention

The present invention relates to an infrared optical element and an anti-reflection film used therein.

2. Description Related to the Prior Art

An infrared camera that captures an image using infrared radiation is widely available in recent years. As is widely known, the infrared camera is suitable for imaging in a dark place or through a screen i.e. a thin sheet of cloth. On account of this characteristic, the infrared camera is often set up in various facilities such as a store and a shop as a security or surveillance camera for crime or disaster prevention. The infrared camera is also used in measurement of water volume of a dam, measurement of traffic, and the like. Furthermore, a safe driving support system using the infrared camera is recently known. In this system, the infrared camera is provided on a car body, and a live image captured by the infrared camera is displayed on a monitor installed in a car. This system expands vision of a driver at nighttime, as compared with vision only with visible light, to support safe driving.

A high percentage of infrared radiation is absorbed by atmospheric components including water vapor and the like. Thus, the infrared camera uses infrared radiation of a wavelength band limited within a so-called infrared atmospheric window, in which the absorption of the infrared radiation does not occur. Out of such wavelength band, a near-infrared camera that uses near-infrared radiation having wavelengths of 0.7 to 2.5 µm and a far-infrared camera that uses far-infrared radiation having wavelengths of 3.0 to 1000 µm are in practical use, for example.

Since the infrared camera uses light with long wavelengths, which is categorized as infrared radiation, an optical element e.g. a lens of the infrared camera is composed of a base made of infrared transmitting glass with high refractivity. As conventional infrared transmitting glass, for example, germanium (Ge), zinc selenide (ZnSe), and the like are known. The infrared transmitting glass described above, however, is expensive and has a cost disadvantage. Furthermore, since the infrared transmitting glass described above has a crystalline structure, a processing method thereof is limited to polishing. This results in difficulty in processing into a complex configuration such as a microlens array.

Against this backdrop, a new type of infrared transmitting glass (hereinafter called chalcogenide glass) that predominantly contains sulfur (S), selenium (Se), or tellurium (Te) is recently known (U.S. Patent Application Publication No. 2010/285946). The chalcogenide glass is less expensive than a germanium crystal, the zinc selenide, and the like. Also, the chalcogenide glass is easily processed by molding into the base of the optical element such as the lens, a prism, and a filter.

The infrared transmitting glass generally has high surface reflectance because of the high refractivity, and its transmittance is 60 to 70% at most. Thus, it is known that just processing of the infrared transmitting glass into a desired outside shape of the lens or the like is not enough to obtain incident light intensity sufficient for imaging. For this reason, an anti-reflection film is provided on a surface of the base made of the infrared transmitting glass, in order to reduce a loss of the incident light intensity due to surface reflection.

When the germanium or zinc selenide is used as the infrared transmitting glass, there is known an example of an anti-reflection film including layers of $ZnS$, $CaF_2$, $YF_3$, $Y_2O_3$, $Ge$, $Si$, and the like. Also, it is known to use $TiO_2$ or $Al_2O_3$ as a primary layer to improve adhesion of the anti-reflection film to the base (Japanese Patent Laid-Open Publication No. 6-313802). In the case of using the chalcogenide glass as the base, there are known an anti-reflection film composed of four layers of $Al_2O_3$, Ge, ZnS, and $MgF_2$ to improve durability (Japanese Patent No. 3361621), and an anti-reflection film having a layer of $CeO_2$ over layers of Ge, ZnS, CeF3, and the like to improve weather resistance (Japanese Patent Laid-Open Publication No. 2006-72031).

As described above, the infrared camera is set up not only inside a room where an ambient environment is relatively stable, but also outside the room with large fluctuation in temperature, humidity, and the like and even in a hostile environment such as the car body. Accordingly, sufficient weather resistance is required of the anti-reflection film provided on the surface of the base made of the infrared transmitting glass, such that tarnish, exfoliation, cracking and the like do not occur even if the infrared camera is used in the hostile environment. Furthermore, use of an expensive crystalline base made of the germanium or the like causes cost increase, in the optical element of the infrared camera. Therefore, it is desirable that the optical element is composed of an inexpensive base made of the chalcogenide glass.

However, if a conventional anti-reflection film designed for the germanium crystalline base is provided on a surface of the chalcogenide glass base, adhesion of the anti-reflection film is impaired. Thus, the anti-reflection film may fall off in the hostile environment as described above.

Also, the anti-reflection film designed for the germanium crystalline base often contains a layer made of an expensive material such as germanium. Thus, provision of the anti-reflection film that is designed for the germanium crystalline base on the chalcogenide glass base causes cost increase, even with the use of the inexpensive chalcogenide glass base. Also, cost is generally increased with increase in the number of layers of the anti-reflection film, and hence it is desirable that the anti-reflection film is made of only the most inexpensive possible materials and from a fewest possible number of layers.

Furthermore, the anti-reflection film designed for the germanium crystalline base sometimes contains a layer of $MgF_2$. However, the $MgF_2$ does not have sufficient weather resistance. Accordingly, if such anti-reflection film designed for the germanium crystalline base is used as an anti-reflection film of the chalcogenide glass base, the insufficiency of the weather resistance occurs as a matter of course. In a case where an anti-reflection film contains a layer made of a material of low weather resistance such as the $MgF_2$, it is conceivable to provide a layer of high weather resistance at the topmost of the anti-reflection film. However, when only the topmost layer is made of a high weather-resistant material while an inside layer is made of a low weather-resistant material, as described above, if fluctuation in temperature or humidity brings about slight cracking, exfoliation, or the like of the anti-reflection film, the layer of low weather resistance is exposed to the outside. Thus, the cracking or exfoliation rapidly expands from an exposed point, and a life of a product becomes short. For this reason, it is desirable that the anti-reflection film is made only of high weather-resistant materials.

SUMMARY OF THE INVENTION

An object of the present invention is to inexpensively provide an infrared anti-reflection film that is suitable for provision on a chalcogenide glass base, and is superior in adhesion and weather resistance.

Another object of the present invention is to provide an inexpensive infrared optical element that has improved transmittance of infrared radiation of a predetermined wavelength band, by provision of the anti-reflection film on the chalcogenide glass base.

To achieve the above and other objects of the present invention, an anti-reflection film according to the present invention includes a first thin film layer made of $Bi_2O_3$ and a second thin film layer made of $YF_3$. The first thin film layer and the second thin film layer are laminated in this order on a surface of chalcogenide glass.

It is preferable that the first thin film layer is formed by ion beam assisted deposition.

The second thin film layer preferably includes one or more assisted layers and one or more non-assisted layers formed alternately with each other. The assisted layers are formed with use of the ion beam assisted deposition, while the non-assisted layers are formed without use of the ion beam assisted deposition.

It is preferable that a topmost layer of the second thin film layer situated farthest from the chalcogenide glass is the assisted layer. Also, a lowermost layer of the second thin film layer adjoining to the first thin film layer is the assisted layer. The anti-reflection film may further include a weather resistant layer provided on the second thin film layer. The weather resistant layer is made of a material for improving a weather resistance property of the anti-reflection film. The weather resistant layer is preferably made of at least one of Si, SiO, and $SiO_2$. The weather resistant layer preferably has a thickness of 50 nm or more and 200 nm or less.

An infrared optical element according to the present invention includes a chalcogenide glass base and an anti-reflection film provided on a surface of the base. The anti-reflection film has a first thin film layer made of $Bi_2O_3$, and a second thin film layer made of $YF_3$. The first thin film layer and the second thin film layer are laminated in this order on the base.

The infrared optical element may further include a weather resistant layer formed on the second thin film layer to improve a weather resistance property of the anti-reflection film.

According to the present invention, it is possible to inexpensively provide an infrared anti-reflection film that is superior in adhesion and weather resistance, in the case of using chalcogenide glass as a base. Forming the anti-reflection film on the chalcogenide glass allows provision of an inexpensive infrared optical element that has improved transmittance of infrared radiation in a predetermined wavelength band.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

Figure 1:
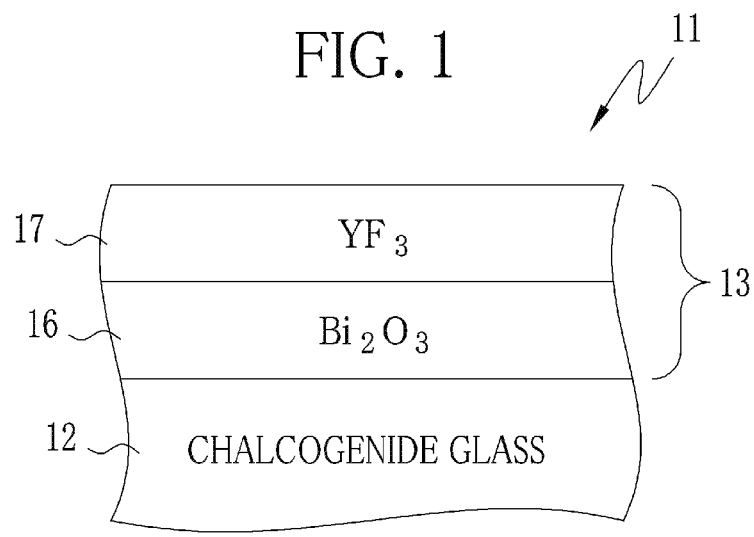
FIG. 1 is an explanatory view showing a layer structure of an anti-reflection film according to an embodiment of the present invention.

Referring to FIG. 1, a lens 11 is used in imaging of far-infrared radiation having wavelengths of 3.0 to 1000 µm. The lens 11 is constituted of a base 12 and an anti-reflection film 13 provided on a surface of the base 12. The base 12 is flat in FIG. 1, but is spherical in actual fact. Note that, when an optical element is a prism or filter, the base 12 has a plate shape.

The base 12 is made of chalcogenide glass, which has a high refractivity of approximately 2.6 in a wavelength band (3.0 to 1000 µm) described above, and has sulfur, selenium, or tellurium (so-called chalcogens) as main ingredients. The chalcogenide glass is inexpensive and superior in processability into a shape of the optical element such as a lens, as compared with other infrared transmitting glass for making a germanium crystalline base and the like. In description below, the base 12 is made of the chalcogenide glass molded into a shape of the lens 11, and the surface of the base 12 is smoothly finished to provide optical functionality.

The anti-reflection film 13 contains two thin film layers, that is, a first thin film layer 16 and a second thin film layer 17 disposed in this order from the side of the base 12.

The first thin film layer 16 is made of bismuth oxide $(Bi_2O_3)$ that has a good adhesion property to the base 12. The $Bi_2O_3$ is insoluble in water. If condensation occurs on a surface of the anti-reflection film 13 according to a usage environment or the like of the lens 11, the first thin film layer 16 is not dissolved in the condensation, and has enough weather resistance as a material of the anti-reflection film 13.

The second thin film layer 17 is made of yttrium fluoride $(YF_3)$. The $YF_3$ has a good adhesion property to the $Bi_2O_3$, and is insoluble in water. Thus, as in the case of the first thin film layer 16 described above, if the condensation occurs on the surface of the anti-reflection film 13, the second thin film layer 17 is not dissolved in the condensation, and has enough weather resistance as a material of the anti-reflection film 13.

Figure 2:
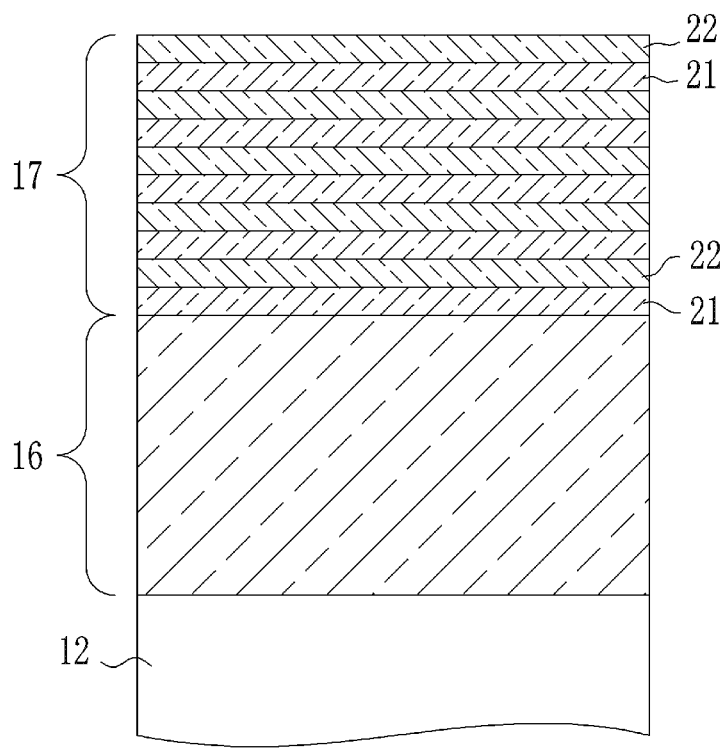
FIG. 2 is an explanatory view of a first thin film layer and a second thin film layer.

As shown in FIG. 2, the first thin film layer 16 is composed of a single layer of the $Bi_2O_3$ that is formed by ion beam assisted deposition, as described later on. Thus, the first thin film layer 16 has a better adhesion property to the surface of the base 12, and a surface (an interface to the second thin film layer 17) of the first thin film layer 16 has a better flatness or smoothness than those of a $Bi_2O_3$ layer deposited without use of the ion beam assisted deposition.

On the other hand, the second thin film layer 17 is entirely made of the $YF_3$, but includes two types of layers, that is, an assisted layer 21 and a non-assisted layer 22 formed by different deposition methods. The one or more assisted layers 21 and the one or more non-assisted layers 22 are alternately laminated or overlaid to each other.

The assisted layer 21 is a layer of the $YF_3$ formed by the ion beam assisted deposition. The thickness of the single assisted layer 21 is one-tenth of the thickness of the entire second thin film layer 17. The assisted layer 21 has a good adhesion property to an under layer and has a surface of good flatness or smoothness, because of being formed by the ion beam assisted deposition.

The non-assisted layer 22 has a thickness of one-tenth of the thickness of the entire second thin film layer 17, similarly to the assisted layer 21. However, the non-assisted layer 22 is different from the assisted layer 21 in that the non-assisted layer 22 is formed without use of assistance of an ion beam. Therefore, the non-assisted layer 22 has a poorer adhesion property to the under layer and has a surface of poorer flatness or smoothness than those of the assisted layer 21, but has a smaller internal stress than that of the assisted layer 21.

By alternately laminating the assisted layers 21 and the non-assisted layers 22 formed as described above, approximately ten layers in total, the second thin film layer 17 works as a buffer to relieve internal stress of the first and second thin film layers 16 and 17. Accordingly, the anti-reflection film 13 can be formed without occurrence of cracking or exfoliation from the base 12. Also, a multilayer structure of the second thin film layer 17 prevents occurrence of cracking in the anti-reflection film 13 and exfoliation of the anti-reflection film 13 from the base 12, even if an ambient environment of the lens 11 e.g. temperature or humidity around the lens 11 fluctuates.

Figure 3:
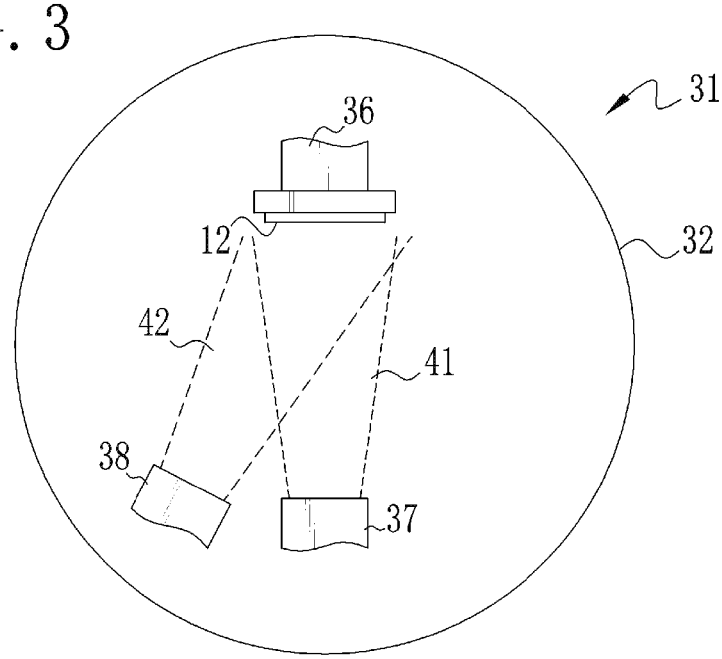
FIG. 3 is a schematic view of a vapor deposition device.

Referring to FIG. 3, the anti-reflection film 13 having the above structure is formed on the surface of the base 12 by a vapor deposition device 31. The vapor deposition device 31 is switchable between a mode of using the ion beam assistance (ion beam assisted deposition) and a mode without using the ion beam assistance. The vapor deposition device 31 is constituted of a vacuum chamber 32, abase holder 36, a deposition material holder 37, an ion source 38, and the like. The base holder 36, the deposition material holder 37, and the ion source 38 are disposed in the vacuum chamber 32.

The base holder 36 holds the base 12 on which a thin film layer is to be deposited. The position and angle of the base holder 36 relative to the deposition material holder 37 and the ion source 38 are flexibly shiftable by a not-shown shift mechanism. The base holder 36 is provided with a heater (not shown) to heat the held base 12 to a predetermined temperature during formation of the anti-reflection film 13.

The deposition material holder 37 separately holds plural types of materials to be deposited. Here, the deposition material holder 37 holds the $Bi_2O_3$ being a material of the first thin film layer 16 and the $YF_3$ being a material of the second thin film layer 17 separately from each other. Upon application of an electron beam from an electron gun (not shown) to each material, the material is heated and melt and sputtered from the deposition material holder 37. Particles 41 of the material sputtered from the deposition material holder 37 are deposited on the surface of the base 12, and forms the thin film layer. Note that, the material sputtered from the deposition material holder 37 is appropriately chosen in accordance with the thin film layer to be formed on the base 12.

The ion source 38 applies an ion beam 42 to the base 12 held by the base holder 36. The ion beam 42 consists of an inert gas such as an argon gas ionized and accelerated to a predetermined speed. Ions of the inert gas collide with the particles 41 of the material to be deposited, and supply the particles 41 with energy in order to assist deposition of the particles 41. When the particles 41 are deposited with assistance of the ion beam 42, as described above, a mixing layer consisting of a material of an under layer and the particles 41 is formed on a surface of the under layer, which is to be the base 12, another thin film layer under the thin film layer to be deposited, or the like. The mixing layer increases the adhesion property of the thin film layer to the under layer, in comparison with the case of deposition without assistance of the ion beam 42. Also, the deposition of the particles 41 with assistance of the ion beam 42 allows formation of the thin film layer having a flatter or smoother surface than that formed without assistance of the ion beam 42. As described above, the ion beam assisted deposition refers to a method of depositing the thin film layer with application of the ion beam 42.

Note that, the vapor deposition device 31 can control the presence or absence of application of the ion beam 42 from the ion source 38, independently of sputtering of the particles 41 of the material to be deposited from the deposition material holder 37. Accordingly, the vapor deposition device 31 can carry out formation of the thin film layer with or without use of the ion beam assisted deposition by switching between the presence and absence of application of the ion beam 42, in accordance with a desired property of the thin film layer to be deposited.

To provide the infrared anti-reflection film 13 on the surface of the chalcogenide glass base 12, as described above, the base 12 is firstly set on the base holder 36, and the vacuum chamber 32 is evacuated to a predetermined pressure. Thereafter, while the ion beam 42 is applied from the ion source 38, the $Bi_2O_3$ is sputtered as the particles 41 to deposit the first thin film layer 16 on the surface of the base 12. At this time, the heater of the base holder 36 heats the base 12 to approximately 100° C.

After that, the material sputtered as the particles 41 is changed from the $Bi_2O_3$ to the $YF_3$, and the $YF_3$ is deposited on the first thin film layer 16 that has been already deposited. At this time, the presence and absence of application of the ion beam 42 are switched whenever deposition of the $YF_3$ reaches a predetermined thickness. To be more specific, the $YF_3$ is firstly deposited with application of the ion beam 42, in order to form the assisted layer 21. Then, the $YF_3$ is deposited without application of the ion beam 42, in order to form the non-assisted layer 22 on the assisted layer 21. Then, the $YF_3$ is deposited with application of the ion beam 42 again, to form the assisted layer 21 on the non-assisted layer 22. In such a manner, the second thin film layer 17 is formed by alternately depositing the assisted layers 21 and the non-assisted layers 22, approximately ten layers in total. Note that, during deposition of the second thin film layer 17, the heater of the base holder 36 heats the base 12 to approximately 100° C., as in the case of deposition of the first thin film layer 16.

Note that, the temperature of the base 12 during deposition of the anti-reflection film 13 is not limited to approximately 100° C., but changeable in accordance with the specific composition of the base 12. However, the chalcogenide glass, which is a material of the base 12, is softened and melted at a temperature relatively lower than those of a germanium crystalline base being typical infrared transmitting glass and visible light transmitting glass. For example, a softening point and melting point of the typical chalcogenide glass is approximately 350° C. On the other hand, to increase the adhesion property of the anti-reflection film 13 to the base 12, the base 12 is preferably heated to as high temperature as possible, during formation of the anti-reflection film 13. Therefore, the anti-reflection film 13 is preferably formed, while the base 12 is heated to the highest possible temperature (for example, approximately 100° C., as described above) without softening and melting the base 12. Taking a case where the base 12 is made of the typical chalcogenide glass having the softening and melting point of approximately 350° C. as an example, the base 12 is preferably heated to 50° C. or more and 200° C. or less, and more preferably heated to 70° C. or more and 150° C. or less, and especially preferably heated to 90° C. or more and 120° C. or less, during formation of the anti-reflection film 13.

The anti-reflection film 13 having the above structure has the good adhesion property to the base 12, and is superior in the weather resistance (especially, water resistance). Taking an infrared optical element having an anti-reflection film containing a material (for example, $MgF_2$) that is not easily dissolved but soluble in water as an example, if the infrared optical element is boiled, a layer of the soluble material is dissolved, and the anti-reflection film easily falls off. On the contrary, since the anti-reflection film 13 is made only of water-insoluble materials of the $Bi_2O_3$ and $YF_3$, dissolution or exfoliation does not occur in the anti-reflection film 13, even if an infrared optical element (for example, the lens 11) having the anti-reflection film 13 is boiled.

Although the anti-reflection film 13 is formed at a low temperature of approximately 100° C. because the base 12 is made of the chalcogenide glass, the anti-reflection film 13 has the good adhesion property due to its structure such that the first thin film layer 16 made of the $Bi_2O_3$ and the second thin film layer 17 made of the $YF_3$ are laminated in this order from the side of the base 12. Furthermore, in the anti-reflection film 13, the first thin film layer 16 that makes contact with the base 12 is formed by the ion beam assisted deposition. Thus, the adhesion property of the anti-reflection film 13 to the base 12 becomes excellent.

Furthermore, the anti-reflection film 13 is made of a combination of anti-cracking materials of the $Bi_2O_3$ and $YF_3$. In addition, the second thin film layer 17 made of the $YF_3$ has a structure such that the assisted layers 21 and the non-assisted layers 22 are alternately laminated, which facilitates striking a balance of the internal stress of the anti-reflection film 13. As a result, cracking hardly occurs in the anti-reflection film 13. Thus, the anti-reflection film 13 can be produced stably. At the same time, if the infrared optical element having the anti-reflection film 13 is used in the hostile environment with large fluctuation in temperature, humidity, and the like, the fluctuation of the ambient environment hardly causes cracking of the anti-reflection film 13, and the anti-reflection film 13 can offer stable optical performance for long time.

Also, the $Bi_2O_3$ and $YF_3$ are inexpensive. For example, the $Bi_2O_3$ is approximately one-tenth of a price of germanium. Thus, the anti-reflection film 13 can be produced at lower cost than that of a conventional infrared anti-reflection film containing a layer of germanium.

Figure 4:
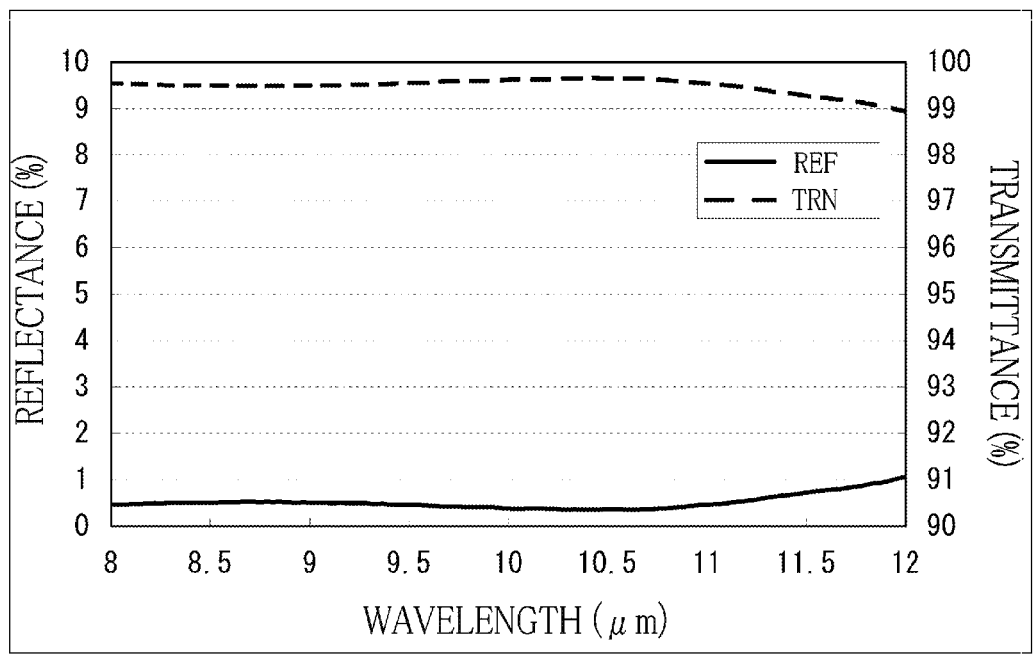
FIG. 4 is a graph of optical properties of chalcogenide glass provided with the anti-reflection film.

FIG. 4 shows an example of transmittance and reflectance of the chalcogenide glass having the above anti-reflection film 13. Here, the chalcogenide glass used in the base 12 was GeSbSe, and a refractive index of the chalcogenide glass with respect to far-infrared radiation having a wavelength of 10 μm was 2.59669. At the same time, in the anti-reflection film 13, the thickness of the first thin film layer 16 ($Bi_2O_3$) was 1380 nm. A refractive index of the first thin film layer 16 with respect to far-infrared radiation having a wavelength of 10 μm was 2.2. The second thin film layer 17 ($YF_3$) had a thickness of 1940 nm, and was composed of the five assisted layers 21 and the five non-assisted layers 22 laminated alternately with each other. A refractive index of the second thin film layer 17 with respect to far-infrared radiation having a wavelength of 10 μm was 1.52.

As shown in FIG. 4, the transmittance of the base 12 having the anti-reflection film 13 is 99% or more (reflectance is 1% or less) within at least a wavelength range of 8 to 12 μm, out of a wavelength range of 3.0 to 1000 μm used in far-infrared radiography. Therefore, the anti-reflection film 13 has a good anti-reflection effect in addition to the good adhesion property and good weather resistance (water resistance), despite the fact that the anti-reflection film 13 is composed of only two types of thin film layers including the first and second thin film layers 16 and 17. Incidentally, the transmittance of the chalcogenide glass (GeSbSe) without the anti-reflection film 13 is 60 to 70% at most.

In the above embodiment, the anti-reflection film 13 consists of the first thin film layer 16 made of the $Bi_2O_3$ and the second thin film layer 17 made of the $YF_3$, but the anti-reflection film 13 does not necessarily consist of the two thin film layers, as long as the anti-reflection film 13 includes the first thin film layer 16 made of the $Bi_2O_3$ and the second thin film layer 17 made of the $YF_3$ that are laminated in this order from the side of the base 12. The anti-reflection film 13 may further include another thin film layer made of another material on the second thin film layer 17.

Figure 5:
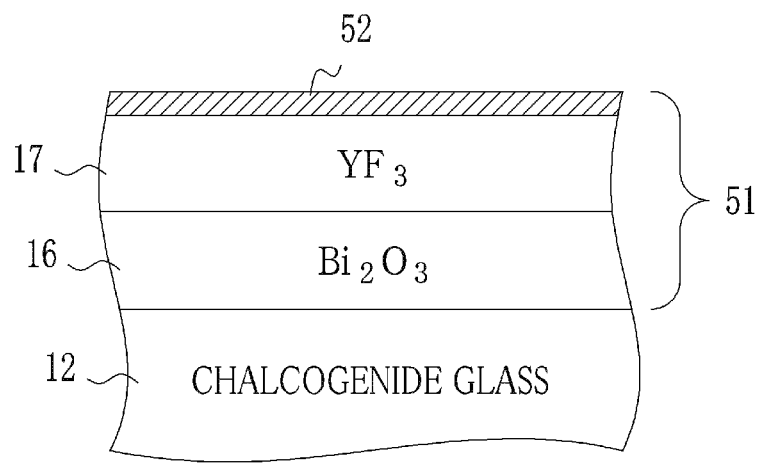
FIG. 5 is an explanatory view showing a layer structure of an anti-reflection film according to another embodiment of the present invention.

For example, as shown in FIG. 5, an anti-reflection film 51 may include three types of thin film layers, that is, the first thin film layer 16, the second thin film layer 17, and a weather resistant layer 52 that are laminated in this order from the side of the base 12. The first and second thin film layers 16 and 17 of the anti-reflection film 51 are the same as those of the anti-reflection film 13 described above. The weather resistant layer 52 is made of at least one of SiO, $SiO_2$, Si, or the like, and sufficiently thin. The weather resistant layer 52 further improves the weather resistance of the anti-reflection film.

The weather resistant layer 52 made of a material described above absorbs a specific wavelength component of infrared radiation used in imaging. However, if the thickness of the weather resistant layer 52 is thin enough, the absorption is almost negligible. For example, when the thickness of the first thin film layer 16 made of the $Bi_2O_3$ is 1321 nm, and the thickness of the second thin film layer 17 made of the $YF_3$ is 1699 nm, and the weather resistant layer 52 is made of the SiO, if the thickness of the weather resistant layer 52 is 100 nm, the anti-reflection film 51 has the improved weather resistance, in addition to a good anti-reflection effect (see FIG. 4) similarly to that of the anti-reflection film 13.

The weather resistant film 52, which is provided for the purpose of further improving the weather resistance of the anti-reflection film, may have an arbitrary thickness, as long as the weather resistance is improved and the absorption of the infrared radiation used in imaging is negligible. However, if the weather resistant film 52 is too thin, the weather resistance is not so improved. If the weather resistant film 52 is too thick, on the other hand, the absorption may become significant and interfere with the imaging. Accordingly, the thickness of the weather resistant film 52 is preferably 50 nm or more and 200 nm or less, and more preferably 80 nm or more and 150 nm or less, and most preferably 90 nm or more and 120 nm or less.

A surface of the infrared optical element is sometimes coated with diamond like carbon (DLC), to improve the weather resistance. If the infrared optical element is provided with the anti-reflection film 13 or 51, coating with the DLC is not necessary because the anti-reflection film 13 or 51 can provide enough weather resistance, but the coating with the DLC may be applied over the anti-reflection film 13 or 51.

The number of layers of the anti-reflection film is appropriately changeable, as long as a thin film layer adjoining to the base 12 is made of the $Bi_2O_3$, and a thin film layer made of the $YF_3$ is provided thereon. Accordingly, for example, after formation of the single first thin film layer 16 and the single second thin film layer 17, another thin film layer made of the $Bi_2O_3$ or $YF_3$ may be formed on the second thin film layer 17 to adjust an optical property of the anti-reflection film. As another example, the anti-reflection film may have a structure such that layers of the $Bi_2O_3$ and layers of the $YF_3$ are alternately laminated from the side of the base 12.

Figure 6:
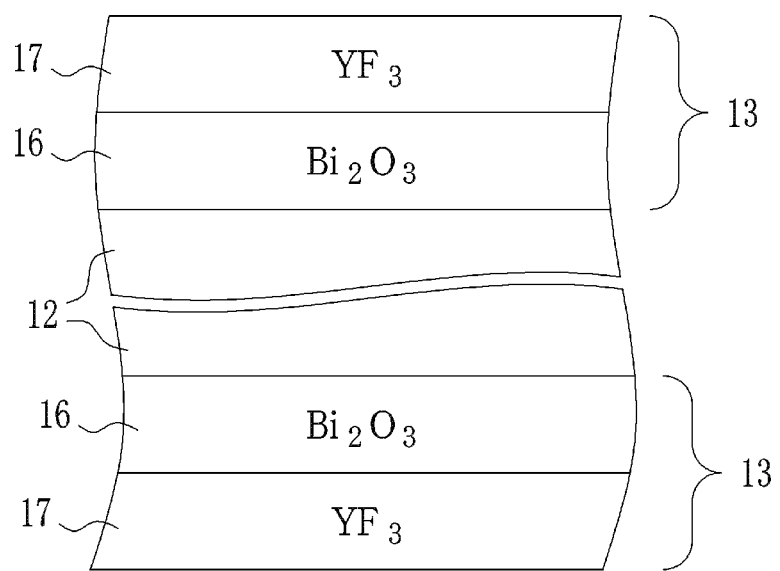
FIG. 6 is an explanatory view showing a layer structure of an anti-reflection film according to further another embodiment of the present invention.

In the above embodiment, the anti-reflection film 13 is provided on one surface of the base 12, but, as shown in FIG. 6, the anti-reflection film 13 may be provided on both front and rear surfaces of the base 12. In the case of providing the anti-reflection film 13 on both surfaces of the base 12, cracking may occur in one of the anti-reflection films 13 formed before the other, depending on the shape or the like of the base 12. To prevent the cracking, it is preferable that the number of the assisted layers 21 and the non-assisted layers 22 of the second thin film layer 17 is made different between the anti-reflection films 13 formed on the front and rear surfaces, in order to strike an overall balance of stress in the two anti-reflection films 13 between the front and rear surfaces.

In the above embodiment, the anti-reflection film 13 has a transmittance of 99% or more in the wavelength band of 8 to 12 μm, out of the wavelength band used in the far-infrared imaging. However, by adjusting the thickness and the like of the first and second thin film layers 16 and 17, the anti-reflection film 13 that has good properties can be produced as with above, in an almost any partial wavelength band as necessary from 3.0 to 1000 μm. Thus, the far-infrared imaging is performed with use of the far-infrared radiation of a partial wavelength band, which is chosen from 3.0 to 1000 μm in consideration of characteristics of an image sensor, absorption by atmosphere, and the like, and the anti-reflection film 13 corresponding to each wavelength band can be produced in a like manner as the above embodiment. The anti-reflection film 13 described in the above embodiment facilitates obtaining the excellent optical property in a wavelength band of the far-infrared radiation, though it depends on concrete properties of the base 12. By adjusting the thickness of the first and second thin film layers 16 and 17, the anti-reflection film may be designed suitably for near-infrared radiation or mid-infrared radiation.

In the above embodiment, out of the two thin film layers composing the anti-reflection film 13, the second thin film layer 17 has the layer structure of the assisted layers 21 and the non-assisted layer 22, but the present invention is not limited to it. For example, the first thin film layer 16 may have a structure such that one or more assisted layers and one or more non-assisted layers are laminated similarly to the second thin film layer 17. If the first thin film layer 16 has the layer structure of the assisted layer and the non-assisted layers, it is possible to more easily strike internal stress of the anti-reflection film 13. Note that, if the first thin film layer 16 has the layer structure, at least a layer that directly contacts the base 12 has to be the assisted layer, for the purpose of securing the adhesion property to the base 12.

In the above embodiment, out of the two thin film layers composing the anti-reflection film 13, the second thin film layer 17 has the structure such that the assisted layers 21 and the non-assisted layers 22 are laminated. Out of the plural assisted and non-assisted layers 21 and 22 composing the second thin film layer 17, at least a layer that directly contacts the first thin film layer 16 is preferably the assisted layer 21. The assisted layer 21 formed on the first thin film layer 16 firmly adheres to the first thin film layer 16, and allows easy production of the second thin film layer 17 having the good adhesion property to the first thin film layer 16. Out of the plural assisted and non-assisted layers 21 and 22 composing the second thin film layer 17, a topmost layer (the farthest layer from the base 12 and the first thin film layer 16) is preferably the assisted layer 21. By providing the assisted layer 21 at the topmost of the second thin film layer 17, it is possible to easily obtain the anti-reflection film 13 of good flatness or smoothness. Furthermore, if the weather resistant layer 52 is provided over the second thin film layer 17, as described above, the adhesion property between the weather resistant layer 52 and the second thin film layer 17 is improved.

In the above embodiment, the second thin film layer 17 has a total of approximately ten layers including the five assisted layers 21 and the five non-assisted layers 22, but the number of the assisted and non-assisted layers 21 and 22 and the thickness of each of the assisted and non-assisted layers 21 and 22 are arbitrary changeable, as long as the assisted layers 21 and the non-assisted layers 22 are laminated alternately with each other.

For example, the number of the assisted and non-assisted layers 21 and 22 may not be ten in total, and is arbitrary changeable. However, the entire thickness of the second thin film layer 17 depends on the optical property of anti-reflection film 13. Thus, the thickness of each assisted or non-assisted layer 21, 22 is reduced with increase in the number of the assisted and non-assisted layers 21 and 22, and each assisted or non-assisted layer 21, 22 is difficult to produce. On the other hand, if the number of the assisted and non-assisted layers 21 and 22 is too small, as in the case of the single assisted layer 21 and the single non-assisted layer 22, it becomes difficult to strike a balance of internal stress of the anti-reflection film 13. For this reason, the second thin film layer 17 preferably has a total of approximately ten layers including the five assisted layers 21 and the five non-assisted layers 22, as in the case of the above embodiment.

The number of the assisted layers 21 may not be equal to that of the non-assisted layers 22. For example, when both of a layer adjoining to the first thin film layer 16 and a topmost layer are the assisted layers 21, the number of the assisted layers 21 is larger than the number of the non-assisted layers 22 by one.

Furthermore, the thickness of each of the assisted and non-assisted layers 21 and 22 is arbitrary changeable, so as to strike a balance of internal stress of the anti-reflection film 13. For example, depending on the shape or the like of the base 12, the assisted layer 21 and the non-assisted layer 22 may have different thickness from each other. Also, for example, the thickness of each assisted or non-assisted layer 21, 22 may be changed in accordance with a position to be laminated, in such a manner that the thickness of each assisted or non-assisted layer 21, 22 is reduced (or increased) in proportion to a distance from the first thin film layer 16.

In the above embodiment, the vapor deposition device 31 is used in formation of the anti-reflection film 13, but another vapor deposition device may be used as long as it can perform the ion beam assisted deposition. For example, the deposition material holder 37 holds the plural materials to be deposited in advance, but the deposition material holder 37 may hold only one type of deposition material, and the material held by the deposition material holder 37 may be appropriately changed. Also, the base holder 36 of the vapor deposition device 31 holds the single base 12, but the base holder 36 may hold plural bases 12 and form the anti-reflection film 13 on each of the plural bases 12 at a time. Furthermore, the base holder 36 is fixed in the above embodiment, but may be rotated or shifted during formation of the anti-reflection film 13, depending on the shape or the like of the base holder 36. The presence and absence of application of the ion beam 42 are not necessarily changeable, but use of two types of vapor deposition devices, that is, a vapor deposition device for performing the ion beam assisted deposition with assistance of the ion beam and a vapor deposition device without assistance of the ion beam, allows formation of the anti-reflection film 13.

In the above embodiment, GeSbSe is used as the chalcogenide glass for making the base 12, but a composition thereof is arbitrary changeable.

In the above embodiment, the infrared optical element is the lens 11, but the anti-reflection film according to the present invention is suitably used in any optical element in addition to a lens, as long as the optical element has the base made of the chalcogenide glass and is designed to be used with the infrared radiation. Accordingly, the shape and size of the base 12 are arbitrary changeable as long as the anti-reflection film 13 can be formed thereon.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An anti-reflection film formed on chalcogenide glass comprising:
    a first thin film layer made of $Bi_2O_3$, being formed on said chalcogenide glass; and
    a second thin film layer made of $YF_3$, being formed on said first thin film layer.

2. The anti-reflection film according to claim 1, wherein said first thin film layer is formed by ion beam assisted deposition.

3. The anti-reflection film according to claim 1, wherein said second thin film layer includes one or more assisted layers and one or more non-assisted layers formed alternately with each other, and said assisted layers are formed with use of ion beam assisted deposition, and said non-assisted layers are formed without use of the ion beam assisted deposition.

4. The anti-reflection film according to claim 3, wherein a topmost layer of said second thin film layer situated farthest from said chalcogenide glass is said assisted layer.

5. The anti-reflection film according to claim 3, wherein a lowermost layer of said second thin film layer adjoining to said first thin film layer is said assisted layer.

6. The anti-reflection film according to claim 1, further comprising:
    a weather resistant layer provided on said second thin film layer, made of a material for improving a weather resistance property of said anti-reflection film.

7. The anti-reflection film according to claim 6, wherein said weather resistant layer is made of at least one of Si, SiO, and $SiO_2$.

8. The anti-reflection film according to claim 6, wherein said weather resistant layer has a thickness of 50 nm or more and 200 nm or less.

9. An infrared optical element comprising:
    a base made of chalcogenide glass; and
    an anti-reflection film provided on a surface of said base, including:
        a first thin film layer made of $Bi_2O_3$, being formed on said base; and
        a second thin film layer made of $YF_3$, being formed on said first thin film layer.

10. The infrared optical element according to claim 9, further comprising:
    a weather resistant layer formed on said second thin film layer to improve a weather resistance property of said anti-reflection film.

* * * * *